United States Patent
Fintel et al.

(10) Patent No.: US 6,920,585 B1
(45) Date of Patent: Jul. 19, 2005

(54) RESOURCE MANAGEMENT FOR TESTING A COMMUNICATION SYSTEM

(75) Inventors: Charles H. Fintel, Oakland, CA (US); Jody L. Krivohlavek, Daly City, CA (US); Eric B. Yarbrough, San Mateo, CA (US); Alfredo B. Bona, Union City, CA (US); Benjamin Lingat Benitez, Union City, CA (US); Mark Joseph Garcia, Redwood City, CA (US); Daniel Pandika, Livermore, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 559 days.

(21) Appl. No.: 09/935,030

(22) Filed: Aug. 22, 2001

(51) Int. Cl.$^7$ .............................................. G06F 11/24
(52) U.S. Cl. ........................ 714/43; 714/25; 709/229
(58) Field of Search .............................. 714/25, 27, 38, 714/43, 46, 47; 702/109, 122, 123; 709/229

(56) References Cited

U.S. PATENT DOCUMENTS

| | | | |
|---|---|---|---|
| 6,269,150 B1 * | 7/2001 | Herrbach et al. | 379/1.01 |
| 6,560,554 B1 * | 5/2003 | Anderson | 702/123 |
| 2001/0052089 A1 * | 12/2001 | Gustavsson et al. | 714/38 |
| 2002/0124205 A1 * | 9/2002 | Grey et al. | 714/33 |

OTHER PUBLICATIONS http://www.svnetworks.com/testexpert/vBrochure.pdf.
http://www.svnetworks.com/testexpert/AVTbroc.pdf.
http://www.svnetworks.com/testexpert/AVTsrtup.pdf.
http://www.svnetworks.com/products/te$_{13}$brochure.htm.
http://www.svnetworks.com/products/features.htm.
http://www.svnetworks.com/products/cellular$_{13}$brochure.htm.

* cited by examiner

*Primary Examiner*—Robert Beausoliel
*Assistant Examiner*—Joseph D Manoskey

(57) ABSTRACT

A resource management system is disclosed that automatically schedules tests for a communication system according to the availability of communication resources requested by the tests. A processing system within the resource management system selects tests from a test database. The processing system identifies one or more communication resources related to the tests. The processing system determines if the identified communication resources requested by the tests are available for the tests. If the communication resources are available, the processing system generates execute instructions to execute the tests. If the communication resources are not available, the processing system puts the tests back in the test database until the communication resources are available. The resource management system efficiently schedules tests of a communication system and saves testing time.

30 Claims, 4 Drawing Sheets

RESOURCE MANAGEMENT FOR TESTING A COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to the field of communication systems, and in particular to a resource management system configured to schedule tests conducted on a communication system.

2. Description of the Prior Art

Communication service providers test performance of a communication system for reasons such as to ensure quality, evaluate modifications and enhancements to the system, and evaluate new devices added to the system. The providers run repetitive tests to evaluate compliance with quality standards and log data from the tests. A test worker usually runs one test at a time using a computer. A problem with testing in this manner is the tests require human participation, which makes continuous testing costly and impracticable.

A solution to manual testing is a test management system. An example of the test management system is the TEST EXPERT designed by Silicon Valley Networks. The test management system provides a central location for storing tests and test data. Tests are entered manually through a Graphical User Interface (GUI) or written into a batch file. The test management system sequentially executes the entered tests using communication resources designated by the tests. The communication resources are equipment and software used in the communication system. The test management system runs the tests according to the order the tests were entered. Success or failure of the tests depends on many factors including an availability of the communication resources related to the tests. The test management system logs test data from the tests. The test data includes a test status message that indicates whether the tests failed or were successful. Test workers evaluate the test data, and the tests that failed are again manually entered into the test management system to be re-run.

A problem with the test management system is the test management system is inefficient and requires manual scheduling of the tests. The order of tests manually entered often does not schedule tests in the most efficient order. Inefficiency results from resources sitting idle while one or more tests are being run. These idle resources could concurrently run another test, which reduces the overall testing time of the scheduled tests. Thus, test times of the communication systems are higher than if the test order was more efficiently selected.

SUMMARY OF THE INVENTION

The invention helps to solve the above problem with a resource management system that automatically schedules tests according to availability of communication resources related to the tests. The resource management system is comprised of a test database and a processing system. The test database stores a plurality of tests. The processing system selects a first test from the test database and identifies one or more communication resources related to the first test. The processing system determines if the communication resources related to the first test are available for the first test. If the communication resources related to the first test are available, the processing system generates an execute instruction to execute the first test.

Alternatively, the resource management system is coupled to a test apparatus and a resource database. The test database receives the plurality of tests from the test apparatus. The processing system selects the first test from the test database and identifies a first communication resource related to the first test. The processing system determines if the first communication resource is available for the first test. To determine if the first communication resource is available, processing system searches the resource database for the first communication resource. The resource database contains a resource list and a state field that contains different state information for the individual communication resources. If the first communication resource is available, the processing system changes the state of the first communication resource to indicate that the first communication resource is being used for the first test. The processing system then generates an execute instruction to execute the first test. If the first communication resource is not available, the processing system stores the first test back in the test database and selects the next test in the test database. Advantageously, the resource management system efficiently schedules tests according to communication resource availability. The resource management system also automates testing of communication systems by scheduling tests without human participation.

DETAILED DESCRIPTION OF THE INVENTION

Figure 1:
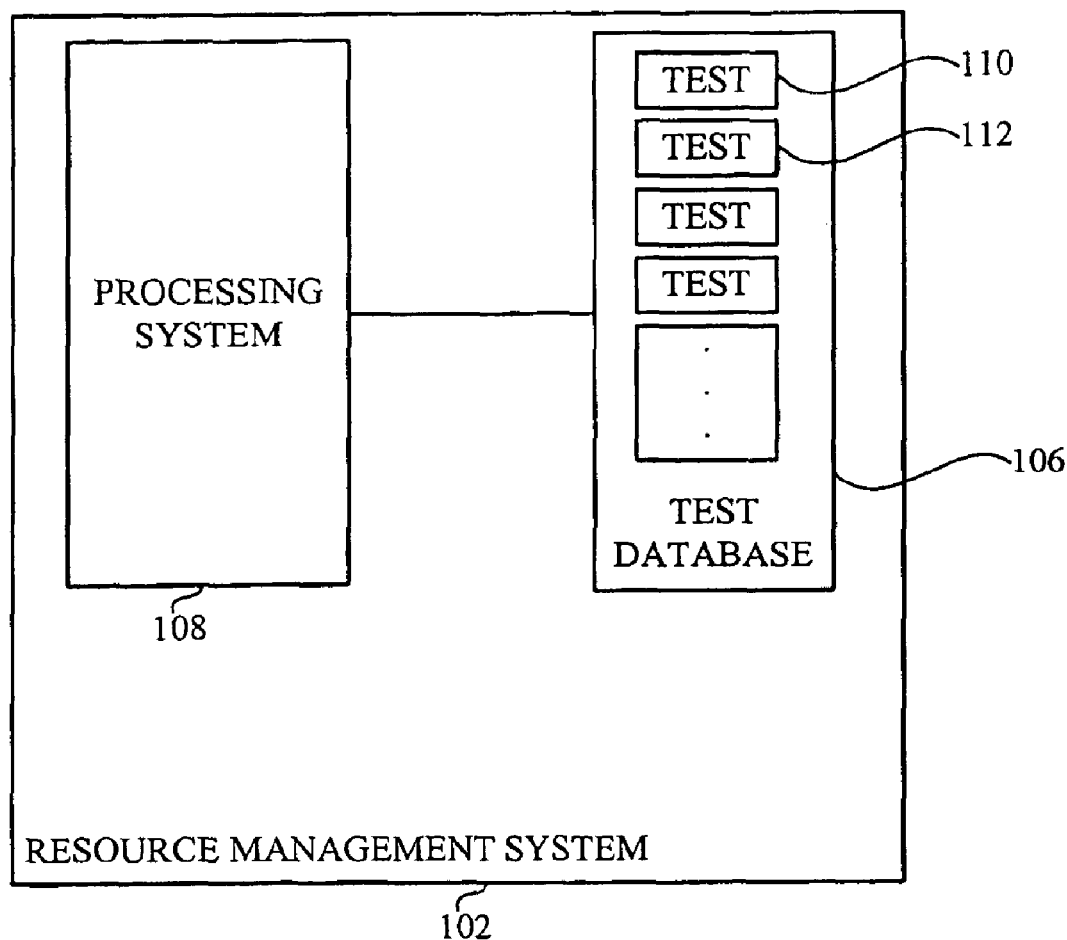
FIG. 1 is a block diagram depicting a resource management system in an example of the invention.

Resource Management System Operation and Configuration—FIG. 1

FIG. 1 depicts a block diagram of a resource management system 102 in accord with the present invention. The resource management system 102 is comprised of a test database 106 and a processing system 108. Test database 106 is coupled to processing system 108. Test database 106 contains tests including a first test 110 and a second test 112. Test database 106 is configured to store tests such as the first test 110 and the second test 112. Processing system 108 is configured to 1) select the first test 110 from test database 106, 2) identify at least one communication resource related to the first test 110, 3) determine if each of the identified communication resources related to the first test 110 is available for the first test 110 before executing the first test, and 4) generate a first execute instruction to execute the first test 110 if each of the identified communication resources related to the first test 110 is available. A communication resource is equipment or software used in a communication system.

In operation, processing system 108 selects the first test 110 from test database 106. Processing system 108 processes the first test 110 to identify one or more communication resources related to the first test 110. Processing system 108 determines if each of the identified communication resources related to the first test 110 is available for the first test 110. Processing system 108 determines the availability of the identified communication resources before generating the first execute instruction. If each of the identified communication resources related to the first test 110 is available, processing system 108 generates the first execute instruction to execute the first test 110.

In some embodiments, processing system 108 stores the first test 110 back in test database 106 if one of the identified communication resources related to the first test 110 is not available for the first test 110. Processing system 108 then selects the second test 112 from test database 106. Processing system 108 processes the second test 112 to identify one or more communication resources related to the second test 112. Processing system 108 determines if each of the identified communication resources related to the second test 112 is available for the second test 112. If each of the identified communication resources related to the second test 112 is available, processing system 108 generates a second execute instruction to execute the second test 112. Processing system 108 selects succeeding tests from test database 106 until test database 106 does not contain any tests.

Resource management system 102 advantageously schedules tests stored in test database 106 according to communication resource availability. Resource management system 102 does not generate an execute instruction for a test until availability of communication resources related to that test has been determined. By scheduling tests according to communication resource availability, resource management system 102 schedules tests more efficiently than prior systems and saves testing time.

Figure 2:
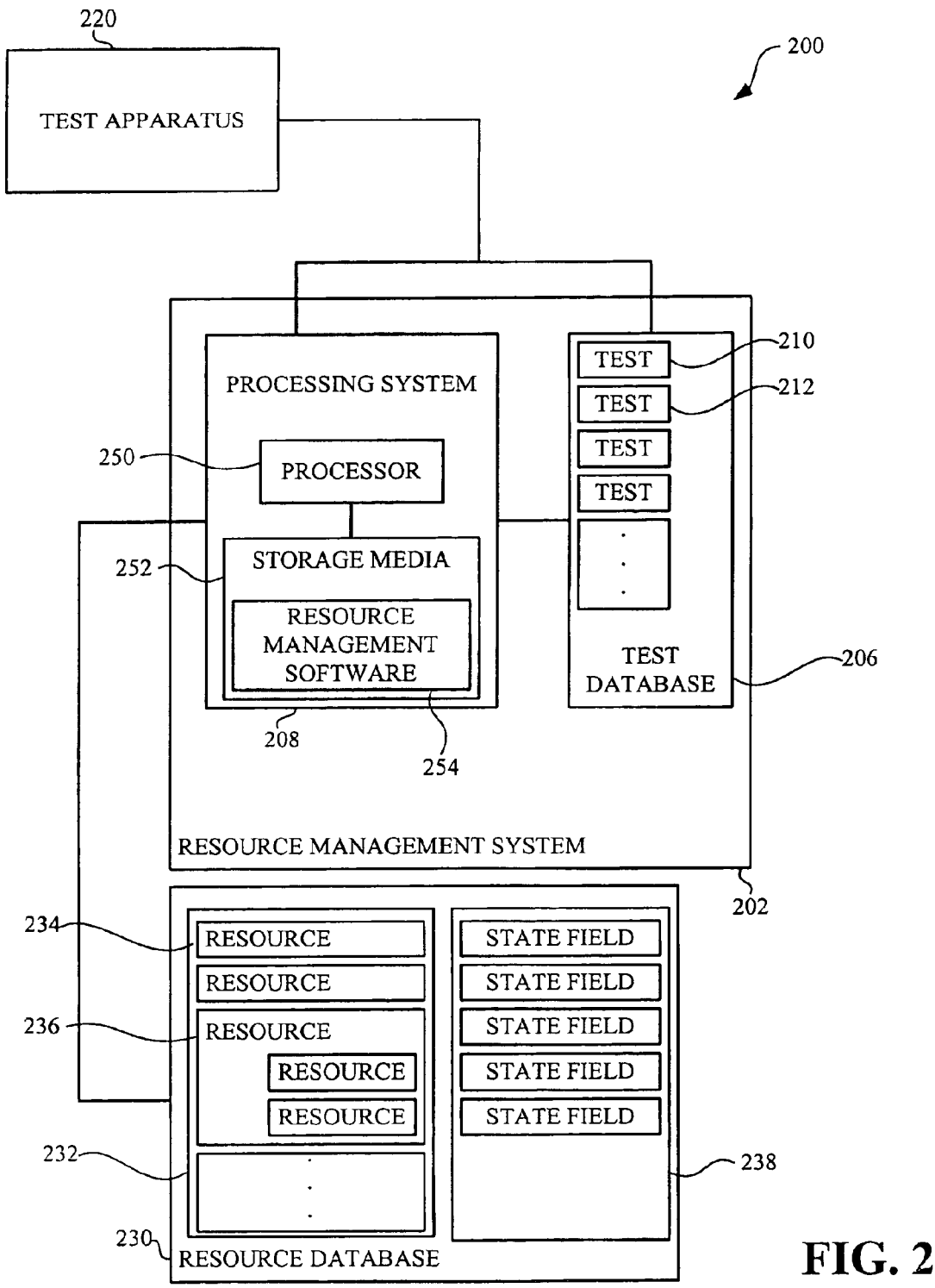
FIG. 2 is a block diagram depicting a test management system in an example of the invention.
Figure 3:
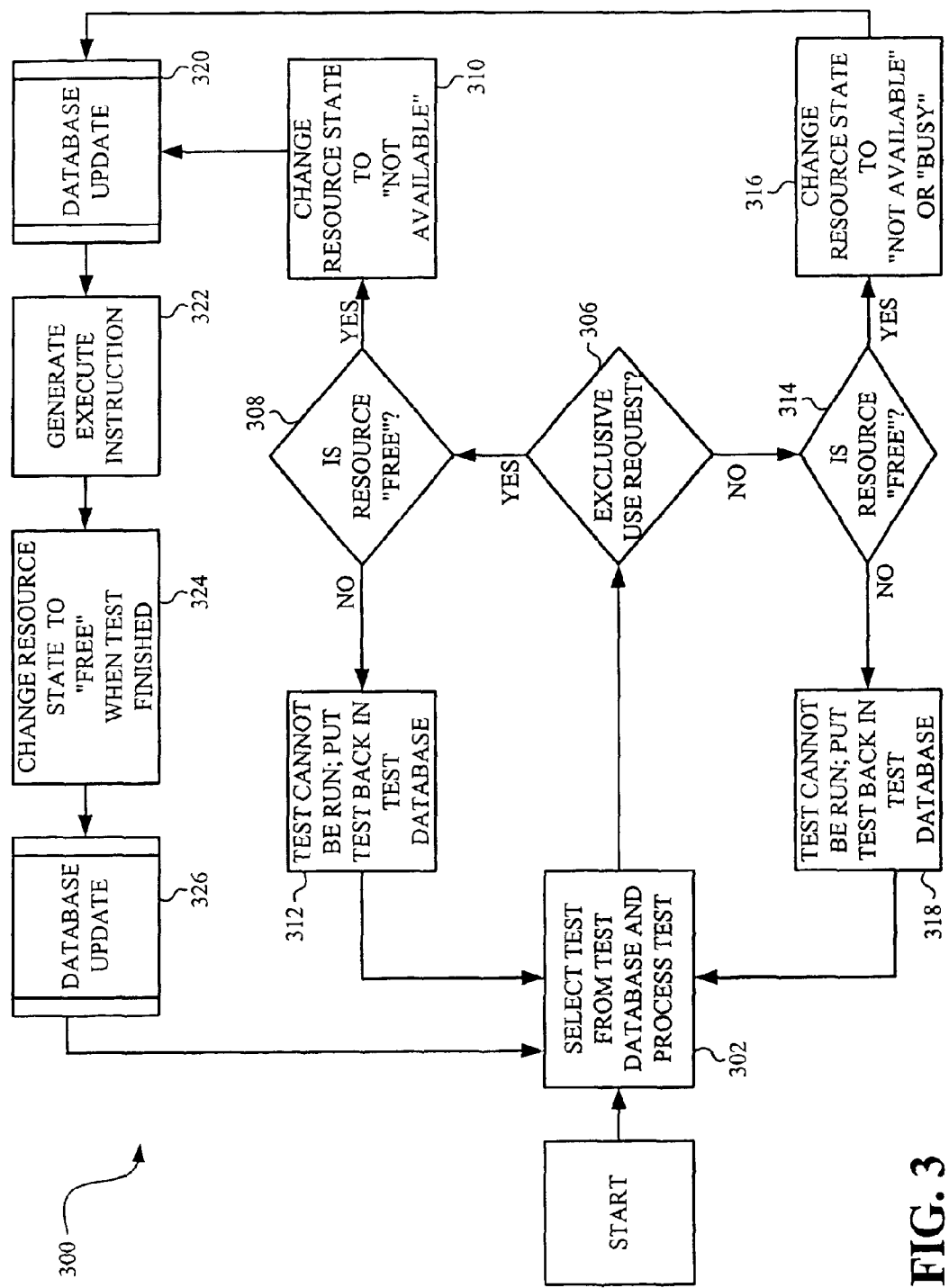
FIG. 3 is a flow chart depicting a process for operating a resource management system in an example of the invention.
Figure 4:
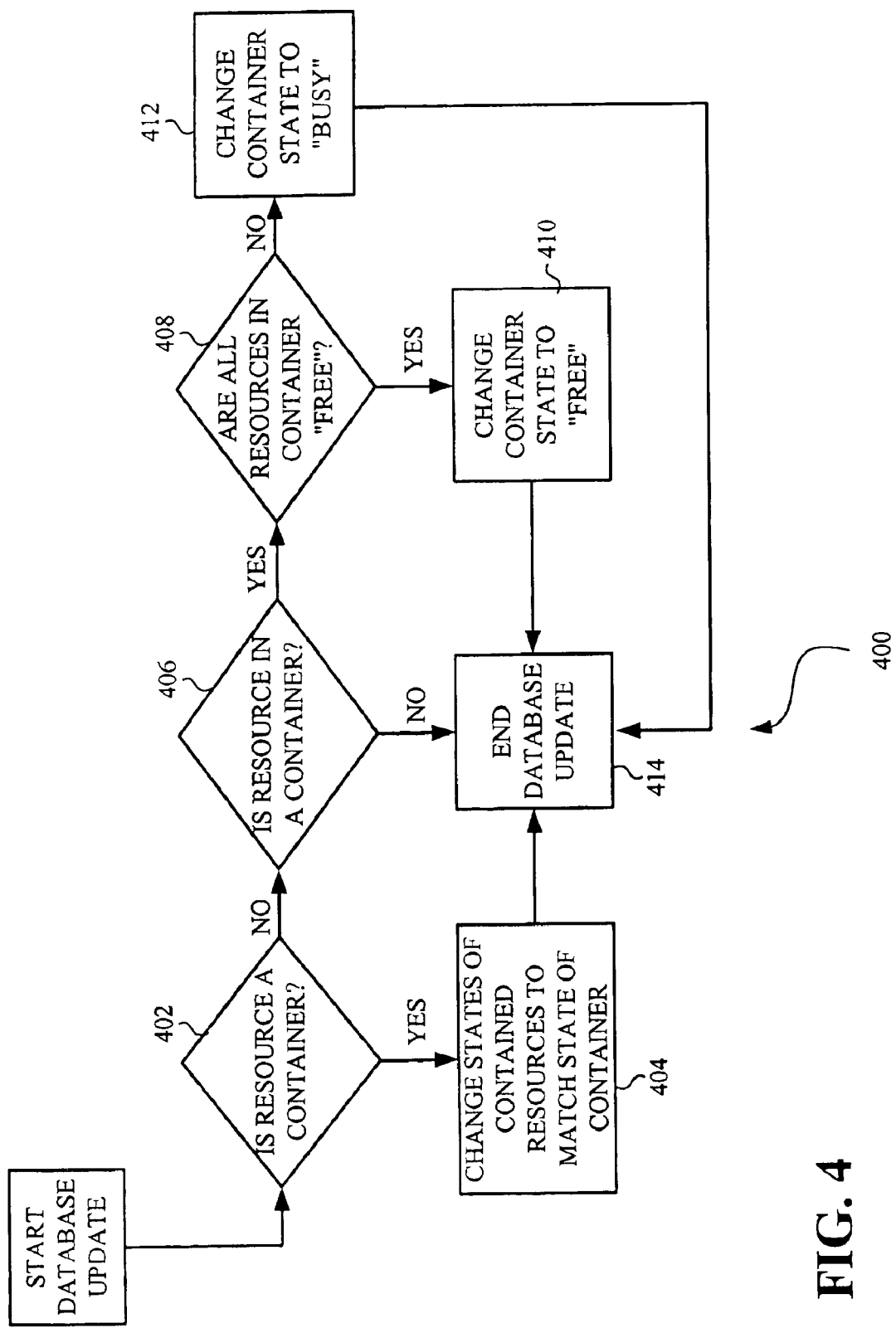
FIG. 4 is a flow chart depicting a process for operating a resource management system in an example of the invention.

Test Management System Operation and Configuration—FIGS. 2–4

FIG. 2 depicts a specific example of a test management system 200 in accord with the present invention. Those skilled in the art will appreciate numerous variations from this example that do not depart from the scope of the invention. Those skilled in the art will also appreciate that various features could be combined to this example to form multiple variations of the invention.

Test management system 200 is comprised of a test apparatus 220, a resource management system 202, and a resource database 230. Resource management system 202 is comprised of a test database 206 and a processing system 208. Processing system 208 is comprised of a processor 250 and a storage media 252. Storage media 252 contains resource management software 254. Test database 206 contains tests including a first test 210 and a second test 212. Resource database 230 contains a resource list 232 and a state field 238. Resource list 232 contains communication resources including communication resource 234 and communication resource 236. Test apparatus 220 couples to test database 206 and processing system 208. Processing system 208 couples to test database 206 and resource database 230.

A communication resource is equipment or software used in a communication system. A communication resource that contains other communication resources is referred to as a container, such as communication resource 236. Resource list 232 lists communication resources in the communication system. State field 238 lists a current state of each of the communication resources in resource list 232. Communication resources in resource list 232 take on the following states: "off-line", "not available", "busy", and "free". The "off-line" state means that a communication resource is new to the system and not yet available for testing. The "not available" state means that a communication resource is currently being used and is not available for another test. The "busy" state applies to containers and means that one or more communication resources contained in a container has a "not available" state. The "free" state means that a communication resource or a container is available for a test.

Each test in test database 206 lists the communication resources that are needed for that test. A test requests either exclusive use or general use of a communication resource. Exclusive use means that only the test requesting the exclusive use can use the communication resource. General use means that the test requesting the general use can use the communication resource and other tests can also use the communication resource if the other tests also request the general use.

Resource management system 202 can be comprised of instructions that are stored on storage media 252 as resource management software 254. The instructions can be retrieved and executed by processor 250. Some examples of instructions are software, program code, and firmware. Some examples of storage media 252 are memory devices, tape, disks, integrated circuits, and servers. As the art progresses, new forms of storage media 252 will be devised. The instructions are operational when executed by processor 250 to direct processor 250 to operate in accord with the invention. Those skilled in the art are familiar with instructions, processors, and storage media.

The operation of test management system 200 is as follows. Test apparatus 220 transfers tests to test database 206. Test database 206 stores the tests including the first test 210 and the second test 212. FIG. 3 shows a process 300 of how resource management system 202 operates. In step 302, processing system 208 selects a test, referred to in this example as the first step 210, from test database 206. Processing system 208 processes the first test 210 to identify communication resource 234 related to the first test 210. Alternatively, the first test 210 relates to a plurality of communication resources such as communication resource 236. In step 306, processing system 208 determines whether the first test 210 requests the exclusive use of communication resource 234. If the first test 210 requests the exclusive use of communication resource 234, then processing system 208 determines whether communication resource 234 is "free" in step 308. Processing system 208 searches resource database 230 for communication resource 234. If processing system 208 locates communication resource 234 in the resource list 232, processing system 208 checks the state of communication resource 234. The resource list 232 contains the state of communication resource 234 in the state field 238. If communication resource 234 is "free", then processing system 208 changes the state of communication resource 234 to "not available" in resource database 230 in step 310. If communication resource 234 is not "free", then processing system 208 puts the first test 210 back in test database 206 in step 312. Processing system 208 then repeats step 302.

If the first test 210 does not request the exclusive use of communication resource 234 in step 306, then processing system 208 determines whether communication resource 234 is "free" in step 314. If communication resource 234 is "free" and is a container, then processing system 208 changes the state of communication resource 234 to "busy" in step 316. If communication resource 234 is "free" and is not a container, then processing system 208 changes the state of communication resource 234 to "not available" in step 316. If the state of communication resource 234 is not "free", then processing system 208 puts the first test 210 back in test database 206 in step 318. Processing system 208 then repeats step 302.

If processing system 208 changes the state of communication resource 234 in step 310 or step 316, processing system 208 updates resource database 230 in step 320. Processing system 208 updates resource database 230 by changing the state of the communication resources in resource database 230 responsive to changing the state of communication resource 234 in steps 310 or 316. A process for updating resource database 230 is discussed later. After processing system 208 updates resource database 230, processing system 208 generates an execute instruction to execute the first test 210 in step 322. After the final test 210 completes operation, processing system 208 changes the state of communication resource 234 to "free" in step 324. Processing system 208 again updates resource database 230 in step 326. Processing system 208 logs test data from the first test 210 and transfers the test data to test apparatus 220. The test data includes a test status message indicating whether the first test 210 failed or was successfully completed. Processing system 208 then repeats step 302.

Processing system 208 performs process 300 in FIG. 3 until test database 206 does not contain any tests. Processing system 208 can generate execute instructions to have multiple tests running simultaneously depending on the availability of the communication resources requested by the tests. For example, processing system 208 performs process 300 on the first test 210 and the second test 212 concurrently. Processing system 208 does not have to wait for the first test 210 to end before selecting and processing the second test 212. For each test completed, processing system 208 logs the test data. Processing system 208 transfers the test data including the test status message to test apparatus 220.

FIG. 4 shows a process 400 of how processing system 208 updates resource database 230. Processing system 208 first determines whether communication resource 234 is a container in step 402. If communication resource 234 is a container, then processing system 208 changes the state of all communication resources contained in communication resource 234 to match the state of communication resource 234 in step 404. Processing system 208 then ends the database update in step 414. If communication resource 234 is not a container, then processing system 208 determines whether communication resource 234 is contained in a container in step 406. If communication resource 234 is not contained in a container, then processing system 208 ends the database update in step 414. If communication resource 234 is contained in a container, then processing system 208 determines if all communication resources in the container are "free" in step 408. If all the communication resources in the container are "free", then processing system 208 changes the state of the container to "free" in step 410. Processing system 208 then ends the database update in step 414. If all the communication resources in the container are not "free", then processing system 208 changes the state of the container to "busy" in step 412. Processing system 208 then ends the database update 414.

In some embodiments of the invention, test management system 200 connects to a distributed call processing and switching system (referred to herein as target communication system). Examples of test management system 200 operating with the target communication system are as follows. In a first example, the target communication system initially has a "free" state. A test selected by test management system 200 requests an exclusive use of a T-1 line, for instance, within the target communication system. Test management system 200 finds the first "free" T-1 line within the target communication system, and changes the state of the T-1 line to "not available". The target communication system remains "free" for other tests to be run simultaneously. Test management system 200 executes the test on the T-1 line. When the test is completed, test management system 200 changes the state of the T-1 line back to "free".

In a second example, the target communication system initially has a "busy" state. A test selected by test management system 200 requests an exclusive use of a T-1 line within the target communication system. Because the target communication system is not "free", test management system 200 stores the test back into the test database 206 and selects another test.

Test management system 200 advantageously automates testing of a communication system. Resource management system 202 efficiently schedules tests, transferred by test apparatus 220, according to resource availability. Resource management system 202 does not generate an execute instruction for a test until availability of communication resources related to that test has been determined. By scheduling tests according to communication resource availability, resource management system 202 schedules tests more efficiently than prior systems and saves testing time.

Those skilled in the art will appreciate variations of the above-described embodiments that fall within the scope of the invention. As a result, the invention is not limited to the specific examples and illustrations discussed above, but only by the following claims and their equivalents.

We claim:

1. A method of automating testing of a communication system including communication resources, the method comprising:

selecting a first test for execution from a plurality of tests stored in a test database;

processing the first test to identify at least one first communication resource related to the first test;

determining if the at least one first communication resource related to the first test is available for the first test before executing the first test;

generating a first execute instruction to execute the first test responsive to determining that the at least one first communication resource related to the first test is available for the first test; and storing the first test back in the test database responsive to determining that the at least one first communication resource related to the first test is not available for the first test.

2. The method of claim 1 further comprising receiving the plurality of tests for storage in the test database.

3. The method of claim 1 further comprising processing the first test to determine if the first test requests an exclusive use of the at least one first communication resource.

4. The method of claim 1 further comprising processing the first test to determine if the first test requests a general use of the at least one first communication resource.

5. The method of claim 1 further comprising selecting a second test for execution from the plurality of tests stored in the test database.

6. The method of claim 5 further comprising processing the second test to identify at least one second communication resource related to the second test.

7. The method of claim 6 further comprising determining if the at least one second communication resource related to the second test is available for the second test before executing the second test.

8. The method of claim 7 further comprising generating a second execute instruction to execute the second test responsive to determining that the at least one second communication resource related to the second test is available for the second test.

9. The method of claim 8 further comprising storing the second test back in the test database responsive to determining that the at least one second communication resource related to the second test is not available for the second test.

10. A resource management system, comprising:
a test database configured to store a plurality of tests; and
a processing system coupled the test database and configured to select a first test for execution from the plurality of tests stored in the test database, process the first test to identify at least one first communication resource related to the first test, determine if the at least one first communication resource related to the first test is available for the first test before executing the first test, generate a first execute instruction to execute the first test responsive to determining that the at least one first communication resource related to the first test is available for the first test, and store the first test back in the test database responsive to determining that the at least one first communication resource related to the first test is not available for the first test.

11. The resource management system of claim 10 wherein said processing system is further configured to couple to a test apparatus and receive the plurality of tests from the test apparatus.

12. The resource management system of claim 11 wherein said processing system is further configured to transfer test results of the first test to the test apparatus.

13. The resource management system of claim 10 wherein said processing system is further configured to couple to a resource database, wherein the resource database is configured to store a list of communication resources.

14. The resource management system of claim 10 wherein said processing system is further configured to process the first test to determine if the first test requests an exclusive use of the at least one first communication resource.

15. The resource management system of claim 10 wherein said processing system is further configured to process the first test to determine if the first test requests a general use of the at least one first communication resource.

16. The resource management system of claim 10 wherein said processing system is further configured to select a second test for execution from the plurality of tests stored in said test database.

17. The resource management system of claim 16 wherein said processing system is further configured to process the second test to identify at least one second communication resource related to the second test.

18. The resource management system of claim 17 wherein said processing system is further configured to determine if the at least one second communication resource related to the second test is available for the second test.

19. The resource management system of claim 18 wherein said processing system is further configured to generate a second execute instruction to execute the second test responsive to determining that the at least one second communication resource related to the second test is available for the second test.

20. The resource management system of claim 19 wherein said processing system is further configured to store the second test back in said test database responsive to determining that the at least one second communication resource related to the second test is not available for the second test.

21. A software product for managing the testing of a communication system including communication resources, the software product comprising:
resource management software configured when executed by a processor to select a first test for execution from a plurality of tests stored in a memory, process the first test to identify at least one first communication resource related to the first test, determine if the at least one first communication resource related to the first test is available for the first test, generate a first execute instruction to execute the first test responsive to determining that the at least one first communication resource related to the first test is available for the first test, and store the first test back in the memory responsive to determining that the at least one first communication resource related to the first test is not available for the first test; and
a computer-readable medium configured to store the resource management software.

22. The software product of claim 21 wherein the resource management software is further configured when executed by the processor to store the plurality of tests.

23. The software product of claim 21 wherein the resource management software is further configured when executed by the processor to generate a resource database that contains a list of communication resources.

24. The software product of claim 21 wherein the resource management software is further configured when executed by the processor to determine if the first test requests an exclusive use of the at least one first communication resource.

25. The software product of claim 21 wherein the resource management software is further configured when executed by the processor to determine if the first test requests a general use of the at least one first communication resource.

26. The software product of claim 21 wherein the resource management software is further configured when executed by the processor to select a second test for execution from the plurality of tests stored in the memory.

27. The software product of claim 26 wherein the resource management software is further configured when executed by the processor to identify at least one second communication resource related to the second test.

28. The software product of claim 27 wherein the resource management software is further configured when executed by the processor to determine if the at least one second communication resource related to the second test is available for the second test.

29. The software product of claim 28 wherein the resource management software is further configured when executed by the processor to generate a second execute instruction to execute the second test responsive to determining that the at least one second communication resource related to the second test is available for the second test.

30. The software product of claim 29 wherein the resource management software is further configured when executed by the processor to store the second test back in the memory responsive to determining that the at least one second communication resource related to the second test is not available for the second test.

* * * * *